(12) United States Patent
Yano et al.

(10) Patent No.: US 8,095,011 B2
(45) Date of Patent: Jan. 10, 2012

(54) WAVELENGTH DIVISION MULTIPLEXING FILTER, WAVELENGTH DIVISION MULTIPLEXING SYSTEM, AND WAVELENGTH DIVISION MULTIPLEXING METHOD

(75) Inventors: Yutaka Yano, Tokyo (JP); Takefumi Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 507 days.

(21) Appl. No.: 12/397,084

(22) Filed: Mar. 3, 2009

(65) Prior Publication Data

US 2009/0226173 A1 Sep. 10, 2009

(30) Foreign Application Priority Data

Mar. 5, 2008 (JP) ................. 2008-054234

(51) Int. Cl.
*H04J 14/02* (2006.01)
(52) U.S. Cl. ................. 398/85; 398/79; 398/82; 398/83
(58) Field of Classification Search .................... 398/43, 398/48, 79, 82, 83, 85
See application file for complete search history.

(56) References Cited

U.S. PATENT DOCUMENTS 7,995,923 B2 * 8/2011 Sakharov ................. 398/82
2005/0146655 A1 7/2005 Barge et al.

FOREIGN PATENT DOCUMENTS

| JP | 2004297228 A | 10/2004 |
| JP | 2006243571 A | 9/2006 |

OTHER PUBLICATIONS

D.A. Fishman et al., "Optical Add/Drop Multiplexer with Asymmetric Bandwidth Allocation and Dispersion, Compensation for Hybrid 10-Gb/s and 40-Gb/s DWDM Transmission", OFC/NFOEC 2006, OWI64, 2006, pp. 1-3.
K. Nakamura, et al. "10G/40G-Hybrid Dense-WDM Systems with Flexible OADM Upgradability", ECOC2003, Tu3.6.6, 2003.

* cited by examiner

*Primary Examiner* — Jack Dinh

(57) ABSTRACT

A wavelength division multiplexing filter according to the present invention is a wavelength division multiplexing filter having a variable filter shape. The wavelength division multiplexing filter has a resolution equal to $2^N$ times (N being an integer, where $N \geq 1$) a reference frequency interval and has frequency arrangement of center frequencies of frequency slots corresponding to the $2^N$-times resolution be offset by half a cycle with respect to the frequency arrangement of standard wavelength grids having a frequency interval equal to $\frac{1}{2^N}$ of the reference frequency interval.

12 Claims, 16 Drawing Sheets

FIG. 9
RELATED ART
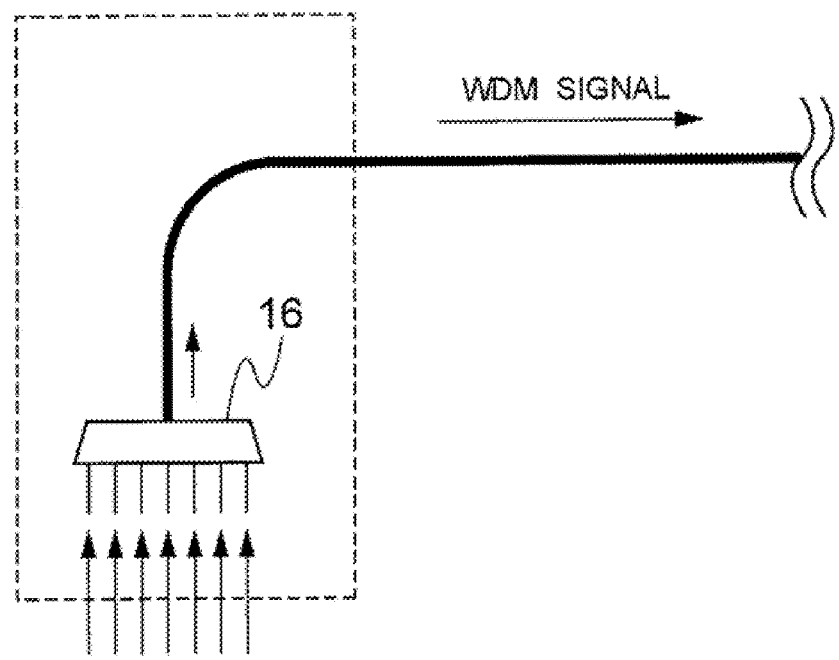
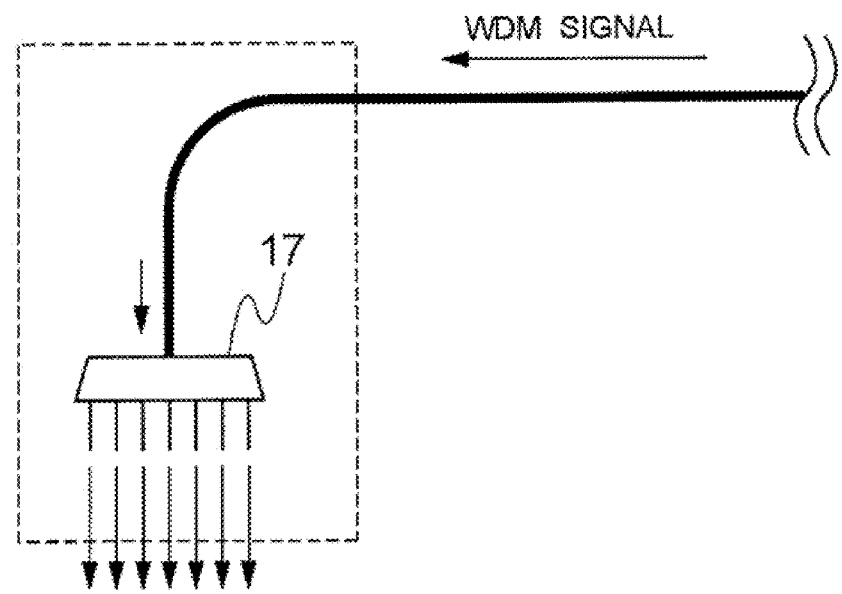

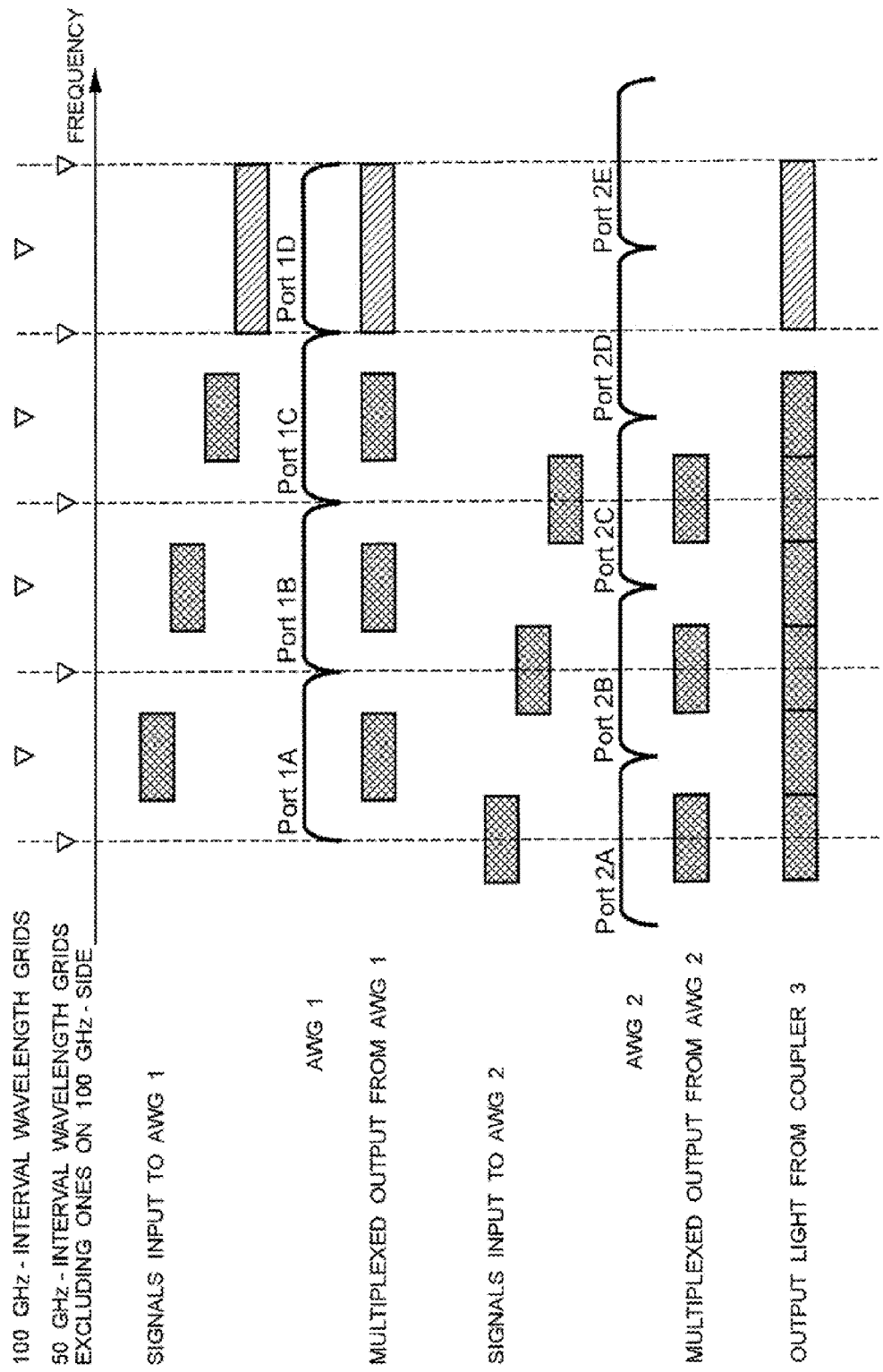

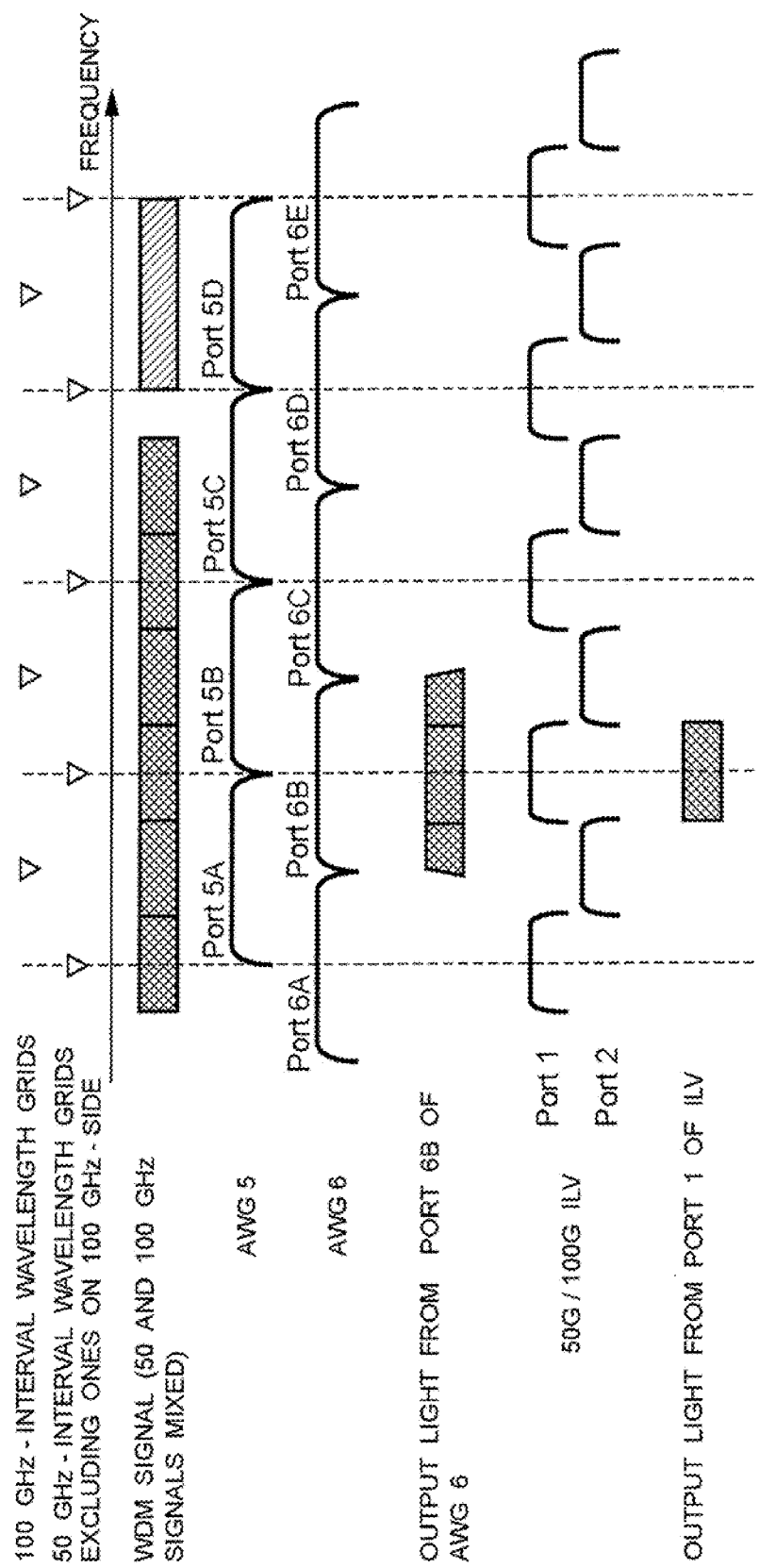

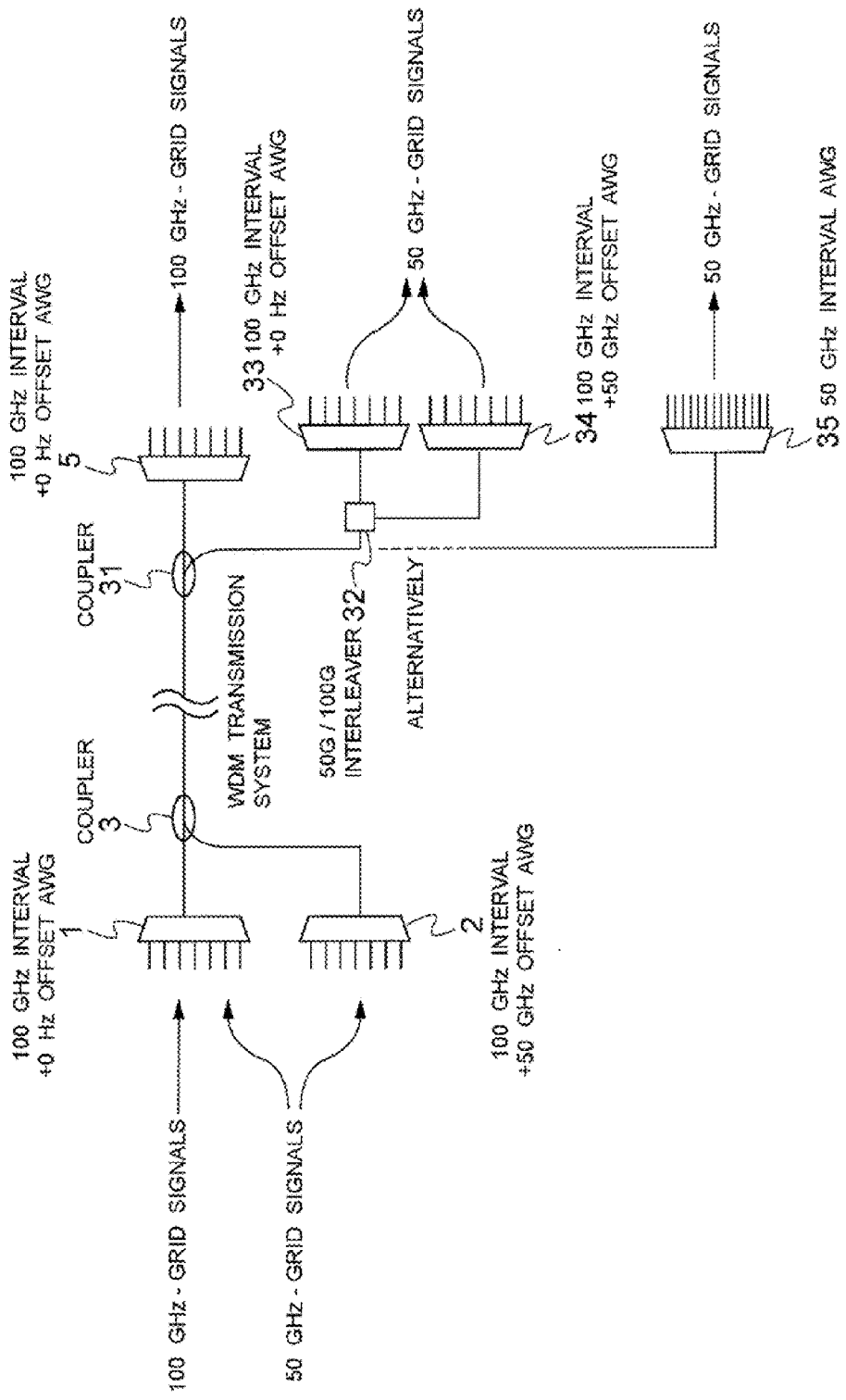

WAVELENGTH DIVISION MULTIPLEXING FILTER, WAVELENGTH DIVISION MULTIPLEXING SYSTEM, AND WAVELENGTH DIVISION MULTIPLEXING METHOD

INCORPORATION BY REFERENCE

This application is based upon and claims the benefit of priority from Japanese patent application No. 2008-054234, filed on Mar. 5, 2008, the disclosure of which is incorporated herein in its entirety by reference.

BACKGROUND OF THE INVENTION

1. Field of the Invention

The present invention relates to a wavelength division multiplexing filter, a wavelength division multiplexing system, and a wavelength division multiplexing method. More particularly, the present invention relates to a wavelength division multiplexing filter having a variable filter shape, and a system for arbitrarily and efficiently multiplexing optical signals of multiple occupation spectral widths.

2. Description of the Related Art

<Wavelength Grid>

In wavelength multiplexing, individual communication channels are multiplexed being assigned to wavelengths. For such wavelengths, standardized wavelengths called wavelength grids, which are recommended by International Telecommunication Union-Telecommunication Standardization Sector (ITU-T) G.694.1, are used.

Wavelength grids are defined at regular intervals starting at a frequency of 193.100 THz, which is defined as anchor frequency. FIG. 6 is a diagram for illustrating wavelength grids. FIG. 6 shows wavelength grids at intervals of 100 GHz. As shown in FIG. 6, frequencies apart from the anchor frequency by 0, ±100 GHz, ±200 GHz, and so on represent wavelength grids.

The standardization of wavelength grid has brought commonality of specifications of optical components that involve wavelength selection, such as optical filters and light sources, among various manufacturers and provided extremely significant industrial advantages.

<Wavelength Division Multiplexing Filter>

In design of a wavelength (or frequency) division multiplexing system, a bandpass filter for multiplexing or demultiplexing wavelength channels is one of important factors (see Japanese Patent Laid-Open Nos. 2004-297228 and 2006-243571, or U.S. Patent Application Publication 2005/0146655, for example). An ideal wavelength division multiplexing filter is one that passes components within a certain frequency range (or a frequency slot) with low loss and eliminates other frequency components. As shown in FIG. 6, a frequency slot is a frequency band assigned to a channel and is a frequency (or wavelength) range defined by boundaries at midpoints between neighboring wavelength grids. A filter characteristic graph with its horizontal axis representing frequency and vertical axis representing passage loss is called a filter shape.

An ideal wavelength division multiplexing filter would have a rectangular filter shape in which loss is low and flat within a predetermined frequency slot, is infinite outside the slot, and steeply changes at the boundary. FIG. 6 shows a frequency slot in a range of ±50 GHz around 193.3 THz as well as an example of a filter shape for multiplexing or demultiplexing a channel corresponding to the frequency slot.

<Filter Synthesis>

Effect given by a filter on a signal is generally linear and the principle of superposition can be employed. That is to say, a series connection of multiple filters can be handled as one filter. Also, within a range in which effects other than the filter are also linear, filtering effects of those filters when regarded as a single filter do not change even if the order of the filters changes.

<Representative Wavelength Division Multiplexing Filter: Fixed Type>

For wavelength division multiplexing filters currently used in wavelength division multiplexing optical transmission systems, several characteristic filters are selectively used. One of such filters is a fixed filter that multiplexes a number of wavelengths into one signal or conversely demultiplexes such a signal into the individual wavelengths, typified by Arrayed Waveguide Grating (AWG). Since filter characteristics of an AWG is not very steep, a filter called interleaver is sometimes used as a complement thereto (see Japanese Patent Laid-Open No. 2004-297228, for example).

An interleaver has one input and two outputs or the reverse, and selects and demultiplexes frequency slots alternately in terms of frequency. Assuming that wavelength grids are numbered, the interleaver classifies (or couples) signals into an even-number wavelength group and an odd-number wavelength group. The interleaver is connected to an AWG, thereby demultiplexing into each individual wavelengths. The filter shape of an interleaver is more rectangular than that of an AWG.

<A Representative Wavelength Division Multiplexing Filter: Variable Type>

For introduction of a new wavelength path and/or bypassing of a wavelength path that is dynamic to some extent, wavelength division multiplexing filters of variable type are also recently used. Known wavelength division multiplexing filters of variable type include Wavelength Blocker (WB) and Wavelength Selective Switch (WSS). Such variable filters are designed to change their filter shape based on electrical control signals (see Japanese Patent Laid-Open No. 2006-243571, for instance).

FIG. 7 schematically illustrates a representative configuration of a variable filter. As shown in FIG. 7, a variable filter is based on the structure of a spectroscope using a diffraction grating 13, and diffracted beam is guided to a mirror 15 that can vary reflection factor or angle from position to position in accordance with an electrical control signal like pixels of a liquid crystal display. Having one pixel correspond to one frequency slot, it is possible to switch between passing (or "through") and blocking for each frequency slot. A WSS uses a variable-angle mirror which can electrically change reflection direction and has a structure in which multiple fibers are arranged in an array as input/output fibers 10. By slightly varying reflection angle from one wavelength to another, path selection on a per-frequency-slot basis is possible.

Some of such WBs and WSSs have a characteristic of being able to combine bands of multiple channels to form one bandpass filter (see U.S. Patent Application Publication No. 2005/0146655, for example). Specifically, such a filter is characterized by forming a completely one bandpass filter with almost no boundary between combined frequency slots. FIG. 8 shows filter shapes obtained by varying the filter shape of a 50 GHz-interval WB in three ways. FIG. 8 plots the filter shapes with a small vertical shift in order to clearly show the individual filter shapes.

FIG. 8 shows the ranges of three frequency slots. Filter shape A is a filter shape that is obtained by setting only slots 1 and 3 to "through" and other slot to "blocking". Similarly, filter shape B is a filter shape obtained by setting only slots 1 and 2 to "through" and other slot to "blocking", and filter shape C is a filter shape obtained by setting all the slots to "through". As shown in FIG. 8, when channels that are set to "through" neighbor each other, boundaries between them are smoothly connected and form no depression. Such variable filters are now generally available. Since almost all channels are used being set to "through" at individual nodes in an actual optical network that includes Optical Add/Drop Multiplex (OADM) and/or Wavelength Cross Connect (WXC), use of a filter having such characteristics can reduce signal spectrum narrowing effect caused by a filter and associated degradation of transmission performance.

<Asymmetry Interleaver>

When the transmission rate differs from channel to channel, the modulation spectral width also differs, and thus a required bandwidth also differs from channel to channel. However, when channels of various transmission rates exist together, frequency slots are secured to suit a channel that requires the widest bandwidth because wavelength grids of a wavelength division multiplexing system are basically at regular intervals. This has two problems. One problem is that utilization of finite and precious transmission bandwidths lowers and is uneconomical because a wide bandwidth is automatically allocated even to a channel that does not require much bandwidth. Another problem is the necessity to decide a channel that requires the widest bandwidth at the time of system introduction.

Even if a wide bandwidth that was not originally envisaged becomes necessary per channel or conversely a prepared wide bandwidth ends up being unnecessary as a result of changes in future technical trends, it is difficult to change filters in a system that has already been put into operation. This is because if filters are to be changed, currently used wavelength channels would all have to be temporarily evacuated to another system.

If it were possible to vary frequency slot width from channel to channel, a signal of a narrow spectrum could be accommodated into a narrow frequency slot and a signal of a wide spectrum into a wide frequency slot, which could improve efficiency of accommodation for the entire wavelength multiplexing. One technique devised for this purpose is an asymmetry interleaver (see "Optical add/drop multiplexer with asymmetric bandwidth allocation and dispersion compensation hybrid 10-Gb/s and 40-Gb/s DWDM transmission", Fishman, D. A. et. al., OFC/NFOEC 2006, OWI64, 2006, and "10G/40G-Hybrid Dense-WDM Systems with Flexible OADM Upgradability", K. Nakamura et. al., ECOC2003, Tu3.6.6, 2003, for example). A typical interleaver is designed such that a port for inputting/outputting even-number wavelengths and a port for inputting/outputting odd-number wavelengths have the same filter shape, whereas the asymmetry interleaver has this ratio be displaced from 50% by intention, e.g., 67%, 33% . . . And a signal of a wide spectral width uses a wavelength grid on the side of wider frequency slots and a signal of a narrow spectral width uses a frequency grid on the side of narrower frequency slots.

When a wavelength division multiplexing optical transmission system handles optical signals of different spectral widths, if frequency slots are fixed and at regular intervals, there would be uneconomically a lot of gaps when the slots accommodate signals of narrow spectral widths, or conversely, they cannot accept signals of wide spectral widths. To resolve this inconvenience, a method of alternately arranging narrow and wide frequency slots has been devised, but as its way of allocation is fixed and not flexible, still leaving the problem of bandwidth waste such as when a system is not operated as originally planned.

Thus, wavelength division multiplexing filters of variable type (WB and WSS) are used, but they have resolution limits. To allow free modification of filter shape, a very fine resolution is required but this is impractical in terms of technology and cost. Thus, it is required to limit the resolution to the minimum amount required, but in turn gaps have to put between channels, which again poses the problem of diseconomy.

This problem is explained using FIG. 13. As a specific example, suppose that a signal having a spectral width that approximately fits into a frequency slot of 100 GHz width (hereinafter called 100 GHz-wide signal) and a signal having a spectral width that approximately fits into a frequency slot of 50 GHz width (hereinafter called 50 GHz-wide signal) are mixed. It seems that the 100 GHz-wide signal can also be handled by using a filter for the finer 50 GHz interval as a wavelength division multiplexing filter, but it is impossible and this will be described below.

Wavelength grids are a series that always includes the original wavelength grids even when the frequency interval between them is reduced to a half or a quarter. This is because when the frequency interval is halved, a new wavelength grid is added at the midpoint between neighboring original wavelength grids. Therefore, a WB or WSS designed for wavelength grids of a half or quarter frequency interval cannot be used for the original wavelength grids. Hereinafter, wavelength grids of such an arrangement standardized by ITU-T G.694.1 will be called standard wavelength grids.

Referring to FIG. 13, it is understood that if a WB or WSS for 50 GHz interval is to be used for multiplexing or demultiplexing of the 100 GHz-wide signal whose center frequency is on standard wavelength grids of 100 GHz interval, its filter shape would overflow into the neighboring channels or an available bandwidth is halved. It can be also seen that use of a finer WB or WSS for 25 GHz interval does alleviate but cannot solve these problems. To alleviate these problems by increasing resolution to the point where there is substantially no trouble, resolution has to be considerably enhanced, which is difficult in terms of cost and technology.

As outlined above, use of a variable filter can allow mixed arrangement of optical signals having different spectral widths with flexibility of a certain degree, but it has the problems of diseconomy associated with unusable and wasted bandwidth formed between wavelength grids and/or reduction of available bandwidths in each frequency slot.

SUMMARY

An exemplary object of the present invention is to provide a wavelength division multiplexing filter, wavelength division multiplexing system, and wavelength division multiplexing method for preventing formation of wasted and unusable bandwidths and enabling free allocation of wavelength bandwidths.

A wavelength division multiplexing filter according to an exemplary aspect of the present invention is a wavelength division multiplexing filter having a variable filter shape, wherein the wavelength division multiplexing filter has a resolution equal to $2^N$ times (N being an integer, where $N \geq 1$) a reference frequency interval and has frequency arrangement of center frequencies of frequency slots corresponding to the $2^N$-times resolution be offset by half a cycle with respect to the frequency arrangement of standard wavelength grids having a frequency interval equal to $1/2^N$ of the reference frequency interval.

A wavelength division multiplexing system according to an exemplary aspect of the present invention is a wavelength division multiplexing system using the wavelength division multiplexing filter described above, wherein the system uses the wavelength division multiplexing filter to multiplex/demultiplex signals whose center frequency is on standard wavelength grids having the reference frequency interval and whose spectral width approximately fits in the reference frequency interval, and signals whose center frequency is on standard wavelength grids having a frequency interval equal to n times (n being an integer, where n≧2) the reference frequency interval and whose spectral width approximately fits in the n-times frequency interval.

A wavelength division multiplexing system according to an exemplary aspect of the present invention is a wavelength division multiplexing system using the wavelength division multiplexing filter described above, wherein the system uses the wavelength division multiplexing filter to multiplex/demultiplex signals whose center frequency is on standard wavelength grids having a frequency interval equal to half the reference frequency interval and whose spectral width approximately fits in the reference frequency interval, and signals whose center frequency is on standard wavelength grids having a frequency interval equal to half the reference frequency interval and whose spectral width approximately fits in a frequency interval equal to n times (n being an integer, where n≧2) the reference frequency interval.

A wavelength division multiplexing method according to an exemplary aspect of the present invention is a wavelength division multiplexing method for a wavelength division multiplexing optical transmission system that includes a wavelength division multiplexing filter having a variable filter shape, the method including, by using the wavelength division multiplexing filter that has a resolution equal to $2^N$ times (N being an integer, where N≧1) a reference frequency interval and that has frequency arrangement of center frequencies of frequency slots corresponding to the $2^N$-times resolution be offset by half a cycle with respect to the frequency arrangement of standard wavelength grids having a frequency interval equal to $1/2^N$ of the reference frequency interval, multiplexing/demultiplexing signals whose center frequency is on standard wavelength grids having the reference frequency interval and whose spectral width approximately fits in the reference frequency interval, and signals whose center frequency is on standard wavelength grids having a frequency interval equal to n times (n being an integer, where n≧2) the reference frequency interval and whose spectral width approximately fits in the n-times frequency interval.

A wavelength division multiplexing method according to an exemplary aspect of the present invention is a wavelength division multiplexing method for a wavelength division multiplexing optical transmission system that includes a wavelength division multiplexing filter having a variable filter shape, the method including, by using the wavelength division multiplexing filter that has a resolution equal to $2^N$ times (N being an integer, where N≧1) a reference frequency interval and has frequency arrangement of center frequencies of frequency slots corresponding to the $2^N$-times resolution be offset by half a cycle with respect to the frequency arrangement of standard wavelength grids having a frequency interval equal to $1/2^N$ of the reference frequency interval, multiplexing/demultiplexing signals whose center frequency is on standard wavelength grids having a frequency interval equal to half the reference frequency interval and whose spectral width approximately fits in the reference frequency interval, and signals whose center frequency is on standard wavelength grids having a frequency interval equal to half the reference frequency interval and whose spectral width approximately fits in a frequency interval equal to n times (n being an integer, where n≧2) the reference frequency interval.

BRIEF DESCRIPTION OF THE DRAWINGS

FIG. 9 shows a configuration of a terminal node;

FIG. 15 is a diagram for illustrating effects of the multiplexing side of the wavelength division multiplexing optical transmission system shown in FIG. 14;

FIG. 16 is a diagram for illustrating effects of the demultiplexing side of the wavelength division multiplexing optical transmission system shown in FIG. 14; and FIG. 17 shows another configuration of a wavelength division multiplexing optical transmission system relating to the present invention.

EXEMPLARY EMBODIMENT

Before describing exemplary embodiments of the present invention, some techniques relating to the present invention will be described for facilitating understanding of the present invention.

<Wavelength Division Multiplexing Optical Transmission System>

Many of present core transmission systems use optical fiber transmission systems that are based on wavelength division multiplexing. By allocating multiple communication channels to different wavelengths and having one optical fiber accommodate the channels, some of presently used systems have a transmission capacity as high as several Tbits/s.

<Modulation Spectral Spread>

Wavelength division multiplexing is a technique to group a number of independent communication channels by wavelength domain, and the spectral width of signals on the individual communication channels is also an important factor in system design. A spectrum widens when a signal is subjected to modulation for putting information to be transmitted on a carrier wave, which is a CW (continuous wave). The width of the spectrum tends to become wider as transmission rate (or bit rate) increases.

If a filter present in a transmission system slices off part of the modulated spectrum, waveform distortion will occur in the signal to cause degradation such as increase in errors in transmitted information. For high-quality transmission with a sufficiently small number of errors, it is necessary to design a filter such that a bandwidth required for transmitting information in question is secured. A width necessary for each signal is required at the minimum for the width of a frequency slot to be allocated to that channel. (A frequency slot wider than necessary is uneconomical but is not a problem from the viewpoint of transmission quality.)

<Concept of Capacity Increase of a Wavelength Division Multiplexing System>

In general, a wavelength division multiplexing system starts operation with a small number of wavelengths (or transmitters/receivers) at the time of introduction and increases wavelength channels (or transmitters/receivers) as traffic demand grows. This is mainly for two reasons. One is for holding down initial investment. Also, as there are several signal formats for transmitters/receivers, it is not necessary to decide the proportion of transmitters/receivers of the respective formats at start of operation. Also, it provides the ability to support a new signal format that did not exist at the time of system introduction if one is defined in future. Another reason is that a transmitter/receiver for the same signal format may become less expensive as a result of technical advances.

<Configuration of a Wavelength Division Multiplexing Node>

Figure 10:
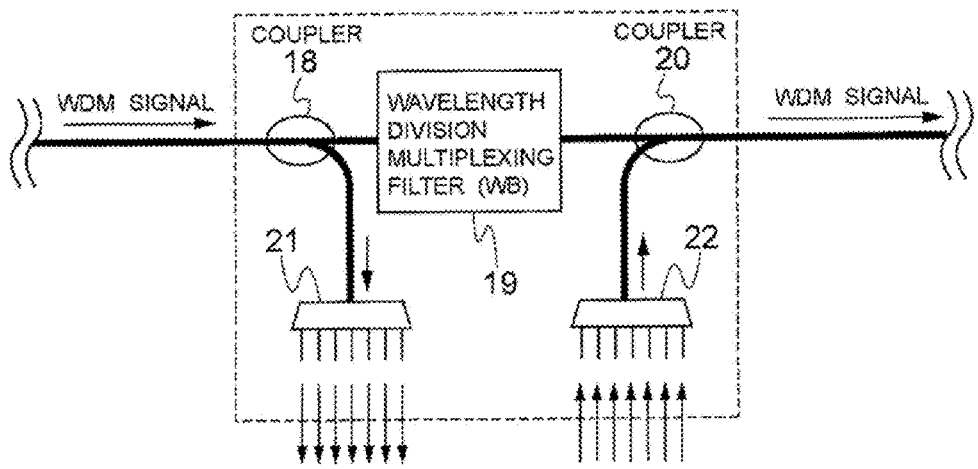
FIG. 10 shows a configuration of a two-degree (two-directional) OADM node.
Figure 11:
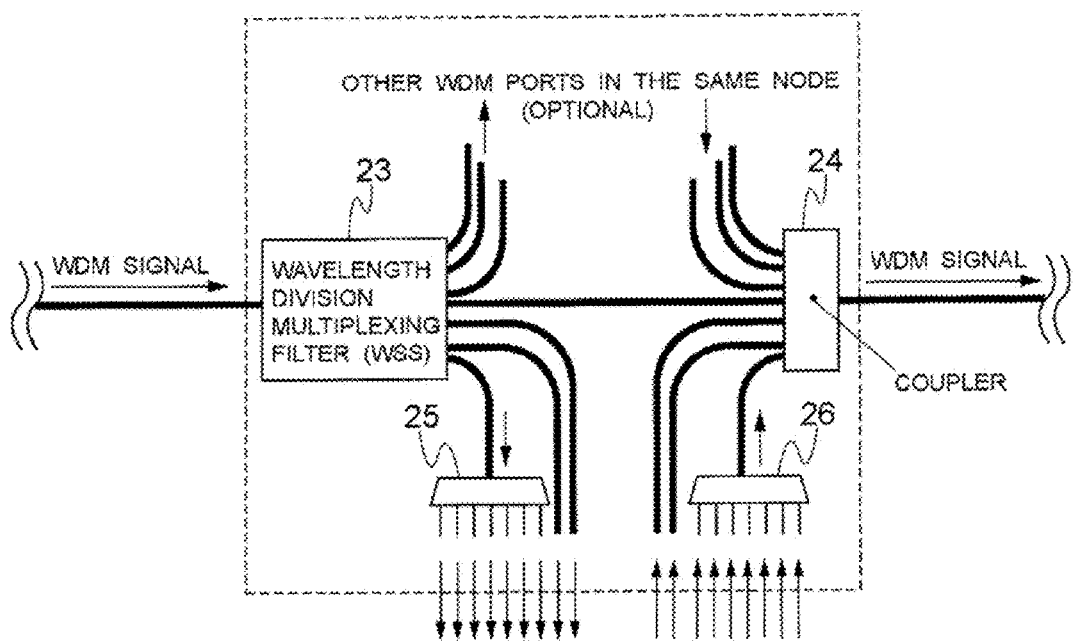
FIG. 11 shows a configuration of a multi-degree (multi-directional) OADM node.
Figure 12:
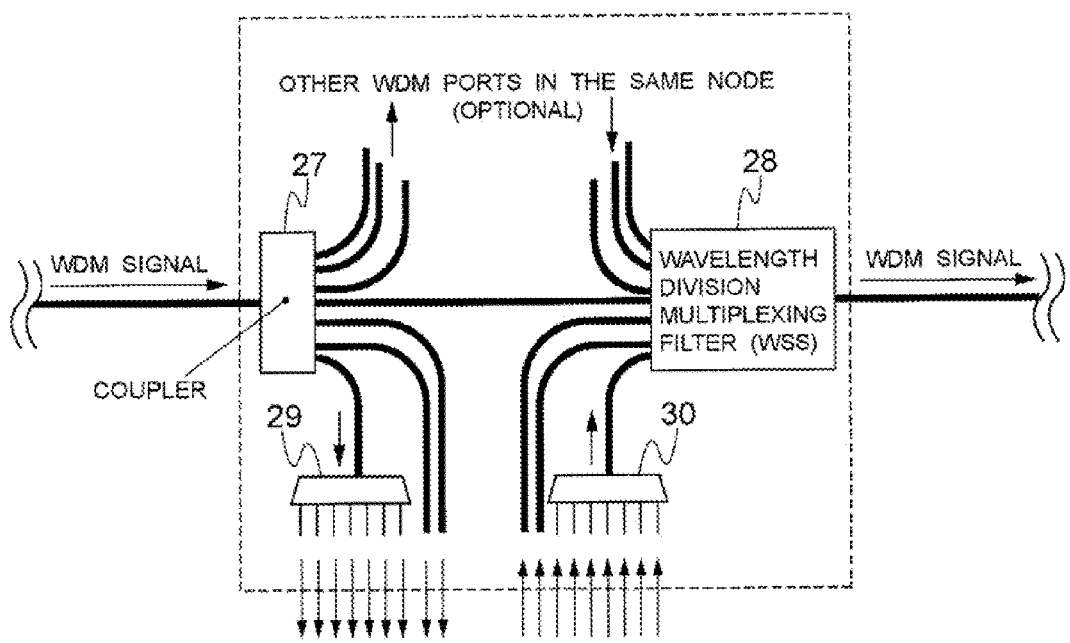
FIG. 12 shows another configuration of a multi-degree (multi-directional) OADM node.

Wavelength division multiplexing filters configured as a node device in a wavelength division multiplexing optical transmission system are conceptually illustrated in FIGS. 9 to 12. FIG. 9 shows a configuration of a terminal node, which includes AWGs 16 and 17. FIG. 10 shows a configuration of a two-degree OADM node, and FIGS. 11 and 12 show configurations of a multi-degree OADM (also called a WXC) node. The number of degrees is the number of opposite points connecting from the node.

The two-degree OADM node shown in FIG. 10 includes couplers 18, 20, a WB 19, and AWGs 21 and 22, being capable of connecting to two opposite points in addition to Add/Drop signal to the node. FIGS. 10 to 12 omit illustration of processing components in the direction opposite to the signal transmitting direction shown therein. FIGS. 11 and 12 show only basic parts that constitute a WXC. The node configuration shown in FIG. 11 includes a WSS 23, a coupler 24, and AWGs 25 and 26, employing a scheme of allocating signals with wavelength selection through the WSS 23 at the time of demultiplexing and coupling through the coupler 24 independently of wavelength at the time of multiplexing. The node configuration shown in FIG. 12 includes a coupler 27, a WSS 28, and AWGs 29 and 30, employing a scheme of allocating signals independently of wavelength through the coupler 27 at the time of demultiplexing and coupling with wavelength selection through the WSS 28 at the time of multiplexing (called a "broadcast and select" system). These two schemes are known as basic schemes. While the configurations of FIGS. 11 and 12 provide the WSS on either the demultiplexing or the multiplexing side, the WSS may be provided on both the demultiplexing and multiplexing sides.

Hereinafter, exemplary embodiments of the present invention will be described with reference to drawings.

A wavelength division multiplexing filter according to a first exemplary embodiment of the present invention is a wavelength division multiplexing filter of a variable filter shape and has a resolution twice as much as a reference frequency interval. In other words, in the wavelength division multiplexing filter according to the first exemplary embodiment, the smallest frequency slot (or frequency range) in which switching between signal passage and blocking is possible corresponds to a frequency interval half the reference frequency interval. Also, in the wavelength division multiplexing filter according to the first exemplary embodiment, frequency arrangement of the center frequency of this frequency slot is offset by half a cycle with respect to the frequency arrangement of standard wavelength grids having a frequency interval half the reference frequency interval. Using such a wavelength division multiplexing filter (WB or WSS), the wavelength of standard wavelength grids having a frequency interval that is an integer multiple of the reference frequency interval can be accommodated.

Figure 1:
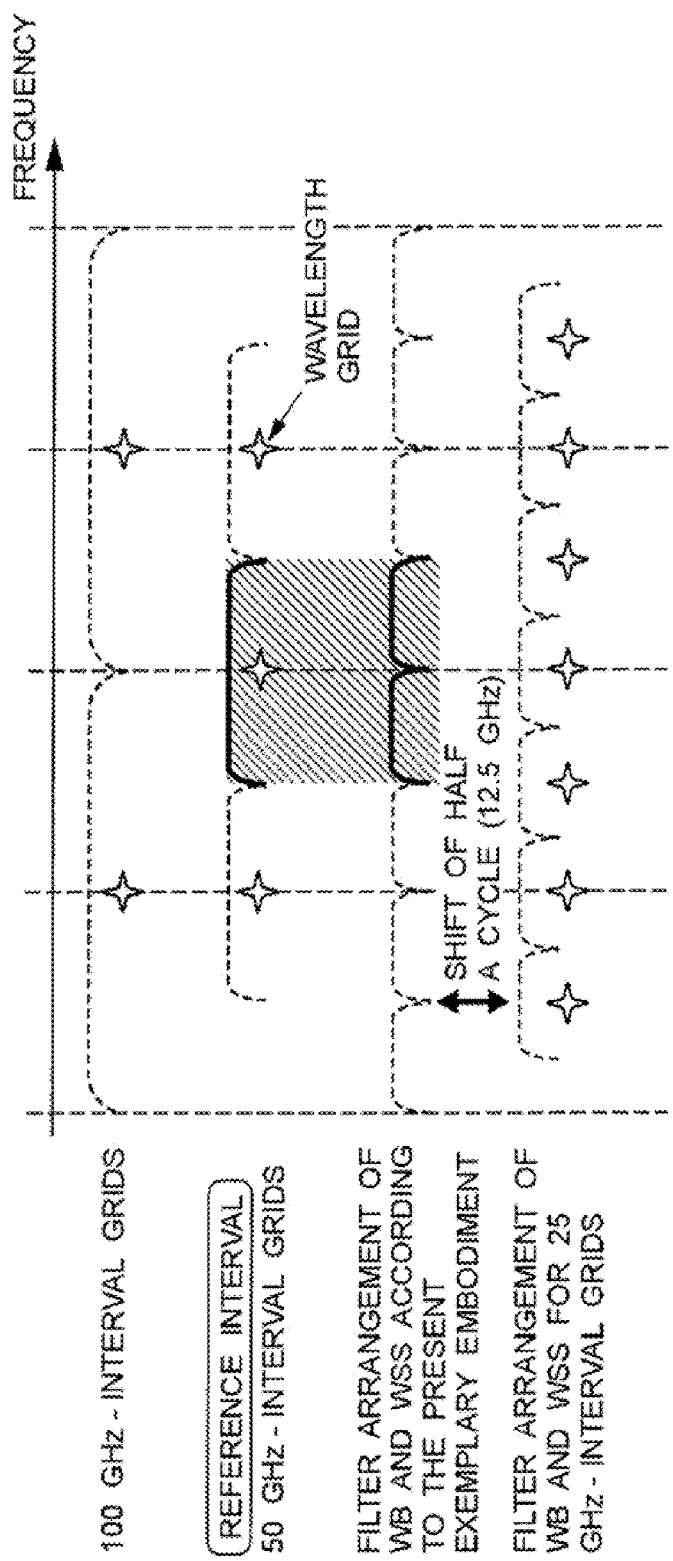
FIG. 1 is a diagram for illustrating a wavelength division multiplexing filter according to a first exemplary embodiment of the invention.

FIG. 1 is a diagram for illustrating the wavelength division multiplexing filter according to the first exemplary embodiment of the invention. In FIG. 1, the reference frequency interval is 50 GHz. As shown in the figure, each of frequency slots of the wavelength division multiplexing filter according to the first exemplary embodiment corresponds to a frequency interval of 25 GHz, half the reference frequency interval, and the frequency arrangement of center frequencies of the frequency slots is shifted by half a cycle (i.e., 12.5 GHz) with respect to the cycle of standard wavelength grids of 25 GHz interval.

Figure 8:
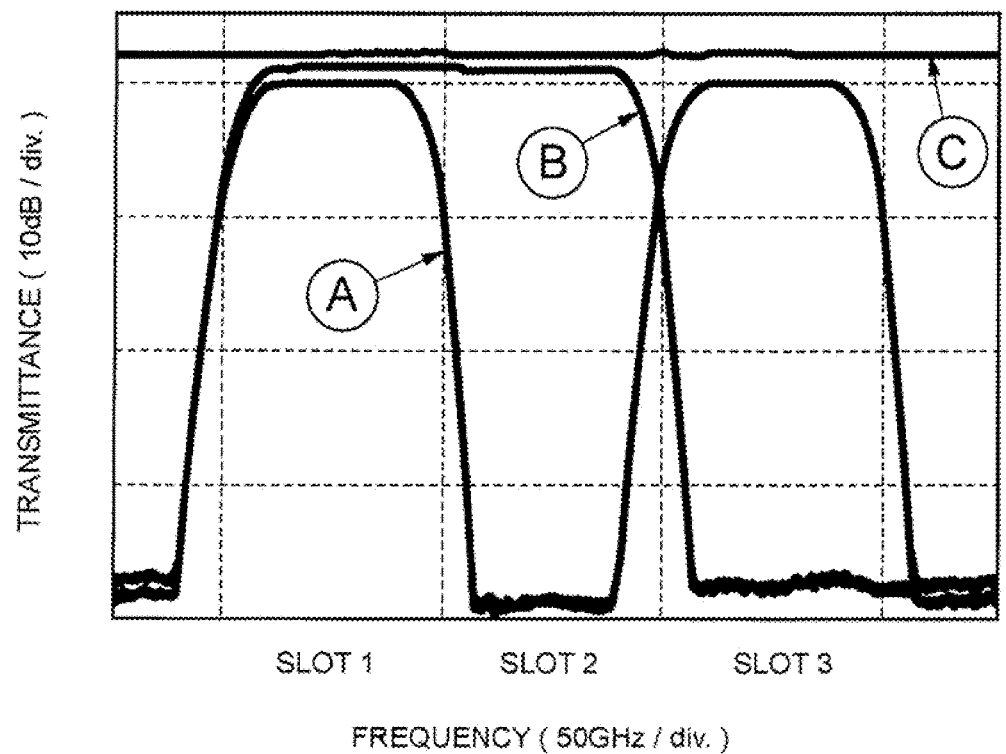
FIG. 8 shows filter shapes obtained by varying the filter shape of a 50 GHz-interval WB in three ways.

As can be readily seen from FIG. 1, two slots of the wavelength division multiplexing filter according to the first exemplary embodiment completely corresponds with one frequency slot of the standard wavelength grids of 50 GHz interval as the reference. Although FIG. 1 shows "dips (depressions)" in gaps between neighboring slots of the wavelength division multiplexing filter of the first exemplary embodiment for the sake of convenience, this portion can be actually perfectly connected because neighboring slots can be combined to form one bandpass filter as described with FIG. 8. Similarly, from the fact that four slots of the wavelength division multiplexing filter according to the first exemplary embodiment corresponds with one frequency slot of the standard wavelength grids of 100 GHz interval, it is understood that the wavelength division multiplexing filter according to the first exemplary embodiment is capable of multiplexing/demultiplexing the 50 GHz- and 100 GHz-wide signals.

Figure 2:
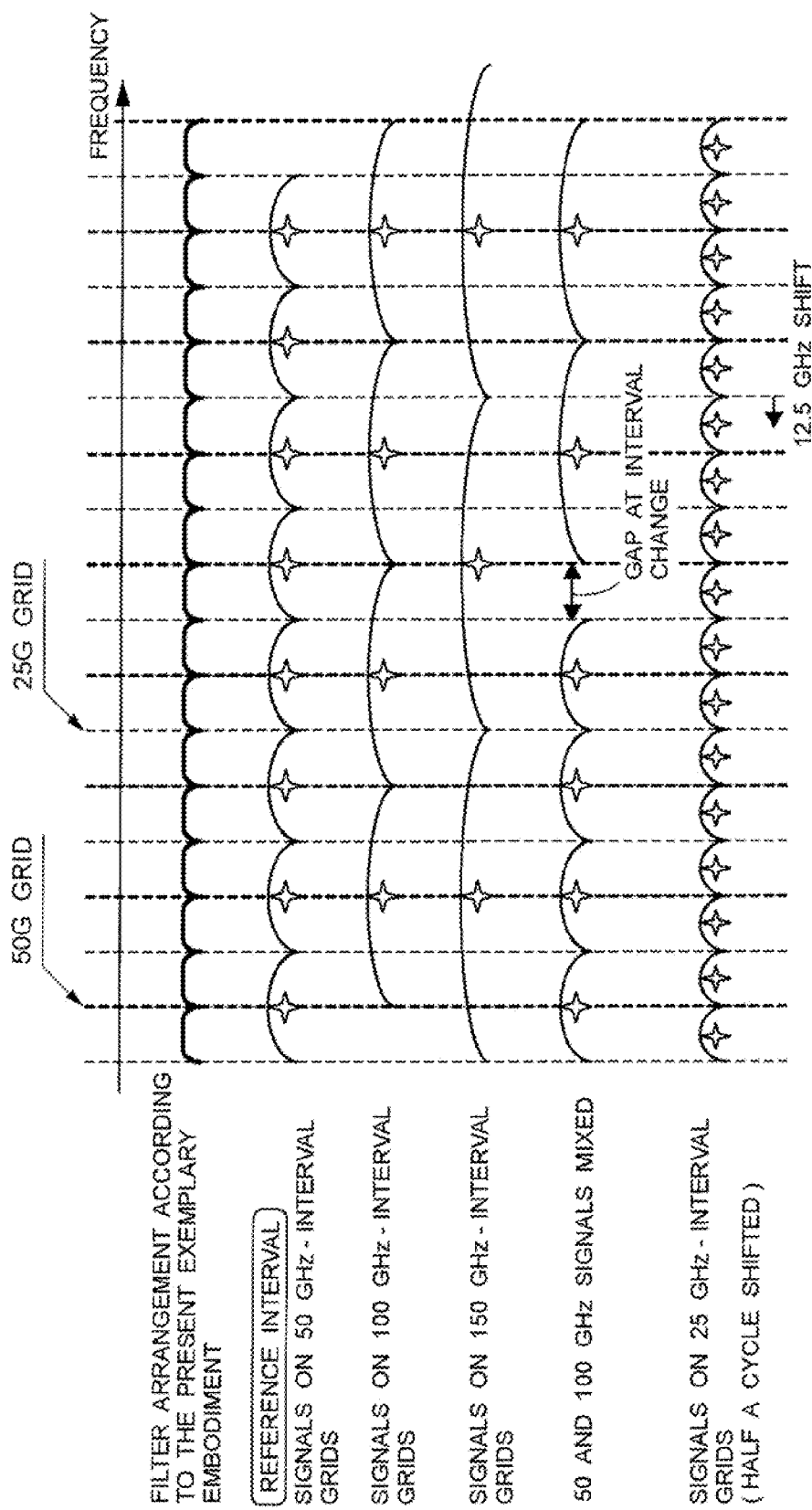
FIG. 2 is a diagram for illustrating accommodation of signals having different spectral widths using the wavelength division multiplexing filter according to the first exemplary embodiment of the invention.

FIG. 2 illustrates accommodation of signals having different spectral widths using the wavelength division multiplexing filter according to the first exemplary embodiment. As mentioned above, two slots of the wavelength division multiplexing filter according to the first exemplary embodiment is equal to one frequency slot of the standard wavelength grids of 50 GHz interval as the reference and four slots thereof is equal to one frequency slot of the standard wavelength grids of 100 GHz interval. Also, six slots of the wavelength division multiplexing filter according to the first exemplary embodiment correspond with one frequency slot of standard wavelength grids of 150 GHz interval.

Figure 13:
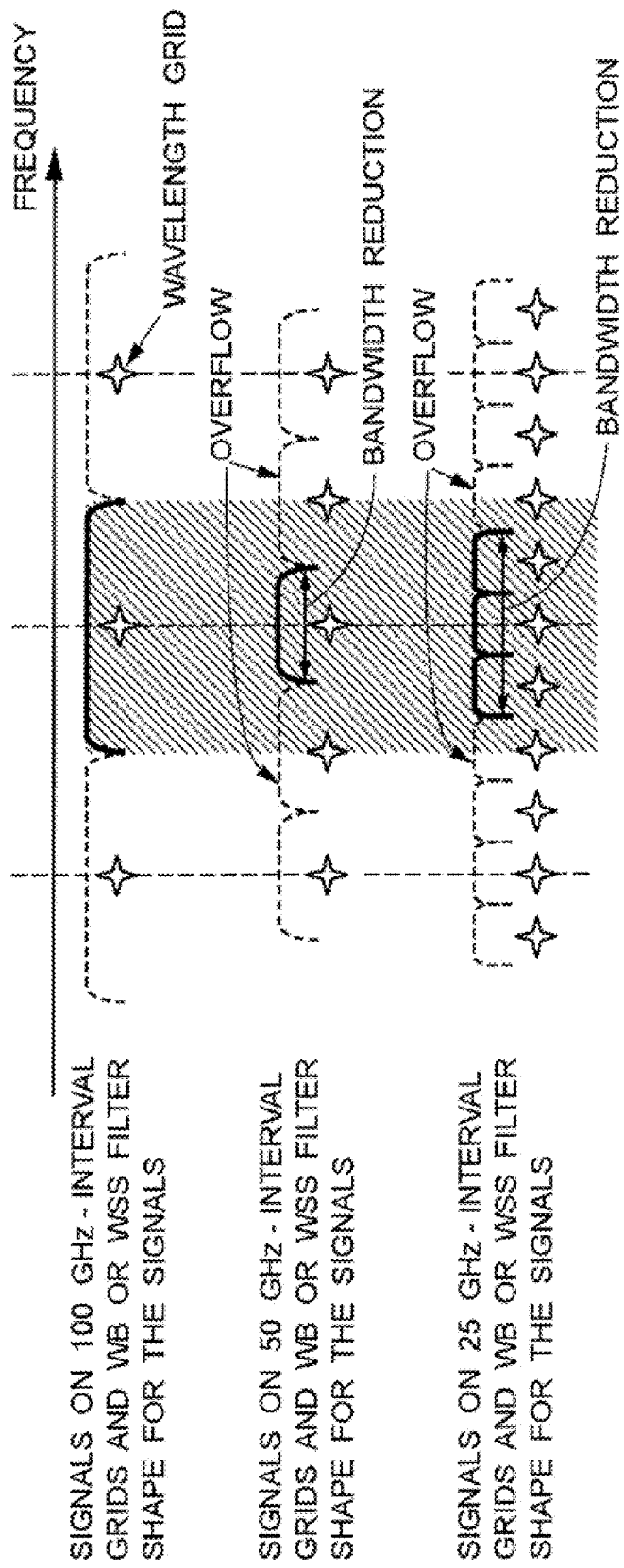
FIG. 13 is a diagram for illustrating problems associated with a variable wavelength division multiplexing filter that relates to the present invention.

Therefore, such overflow as shown in FIG. 13 does not occur, and the 50 GHz-wide signals having their center frequency on the standard wavelength grids of 50 GHz interval as the reference, the 100 GHz-wide signals having their center frequency on the standard wavelength grids of 100 GHz interval, and the 150 GHz-wide signals having their center frequency on the standard wavelength grids of 150 GHz interval can be arranged without gaps between them, as shown in FIG. 2. This characteristic cannot be obtained with a conventional WB or WSS for 50 or 25 GHz interval shown in FIG. 13.

However, when a plurality of different frequency interval series exist together, gaps may be formed at points where such series change. FIG. 2 also shows a case as an example where the 50 GHz-wide signals having their center frequency on the standard wavelength grids of 50 GHz interval as the reference and the 100 GHz-wide signals having their center frequency on the standard wavelength grids of 100 GHz interval are mixed. Since such wasted bandwidth forms at points where one frequency interval series changes to another, it is desirable that signals be arranged so as to minimize such points of change. When signals are of two frequency intervals, points of change can be reduced to as few as one at about the center and thus waste of bandwidth can be reduced by arranging the signals starting respectively from the short-wave and long-wave ends of the overall transmittable bandwidth.

Such a wasted bandwidth formed at a point of interval change is a restriction associated with arrangement of standard wavelength grids and cannot be avoided unless channel wavelengths are shifted from the standard wavelength grids (an exemplary embodiment that introduces the concept of shifting is a second exemplary embodiment of the invention discussed later). To put this conversely, since channel wavelengths are on standard wavelength grids in the first exemplary embodiment, there is no necessity to prepare transmitters/receivers with irregular wavelengths.

The filter arrangement of the wavelength division multiplexing filter according to the first exemplary embodiment is a minimum resolution condition for multiplexing/demultiplexing without waste of signals whose center frequency is on standard wavelength grids of a reference frequency interval and whose spectral width approximately fits in the reference frequency interval and signals whose center frequency is on standard wavelength grids having a frequency interval that is an integer multiple of the reference frequency interval and whose spectral width approximately fits in the integer-multiple frequency interval. The first exemplary embodiment is advantageous in terms of cost because effects that could be obtained from an extremely fine resolution can be obtained just by preparing a WB or WSS having a resolution twice as much as the reference frequency interval.

To enable multiplexing/demultiplexing signals whose spectral width approximately fits into the frequency slot of 25 GHz width using the wavelength division multiplexing filter according to the first exemplary embodiment having an interval of 25 GHz, an optical transmitter/receiver may be used that can shift the center frequency of the signal by half a cycle with respect to the cycle of standard wavelength grids of 25 GHz interval as shown in FIG. 2.

Also, while the reference frequency interval is 50 GHz in the first exemplary embodiment, it is not limited thereto and may be instead 25 or 100 GHz, for example. For instance, when the reference frequency interval is 100 GHz, a WB or WSS of 50 GHz-interval and 25 GHz-shift is used.

In addition, the wavelength division multiplexing filter according to the first exemplary embodiment has a resolution twice as much as the reference frequency interval, and the frequency arrangement of the center frequencies of frequency slots that correspond to this resolution are offset by half a cycle with respect to the frequency arrangement of standard wavelength grids having a frequency interval half the reference frequency interval. However, it may have a resolution four or eight times the reference frequency interval, for example. That is to say, it may be such a wavelength division multiplexing filter that has a resolution $2^N$ times (N being an integer $\geq 1$) the reference frequency interval and has the frequency arrangement of the center frequencies of frequency slots corresponding to that resolution be offset by half a cycle with respect to the frequency arrangement of standard wavelength grids having a frequency interval which is $\frac{1}{2}^N$ of the reference frequency interval. However, even a resolution twice as much as the reference frequency interval (N=1) can provide sufficient effects and is more advantageous in terms of cost than a resolution that is four or eight times, for example, the reference frequency interval.

Figure 3:
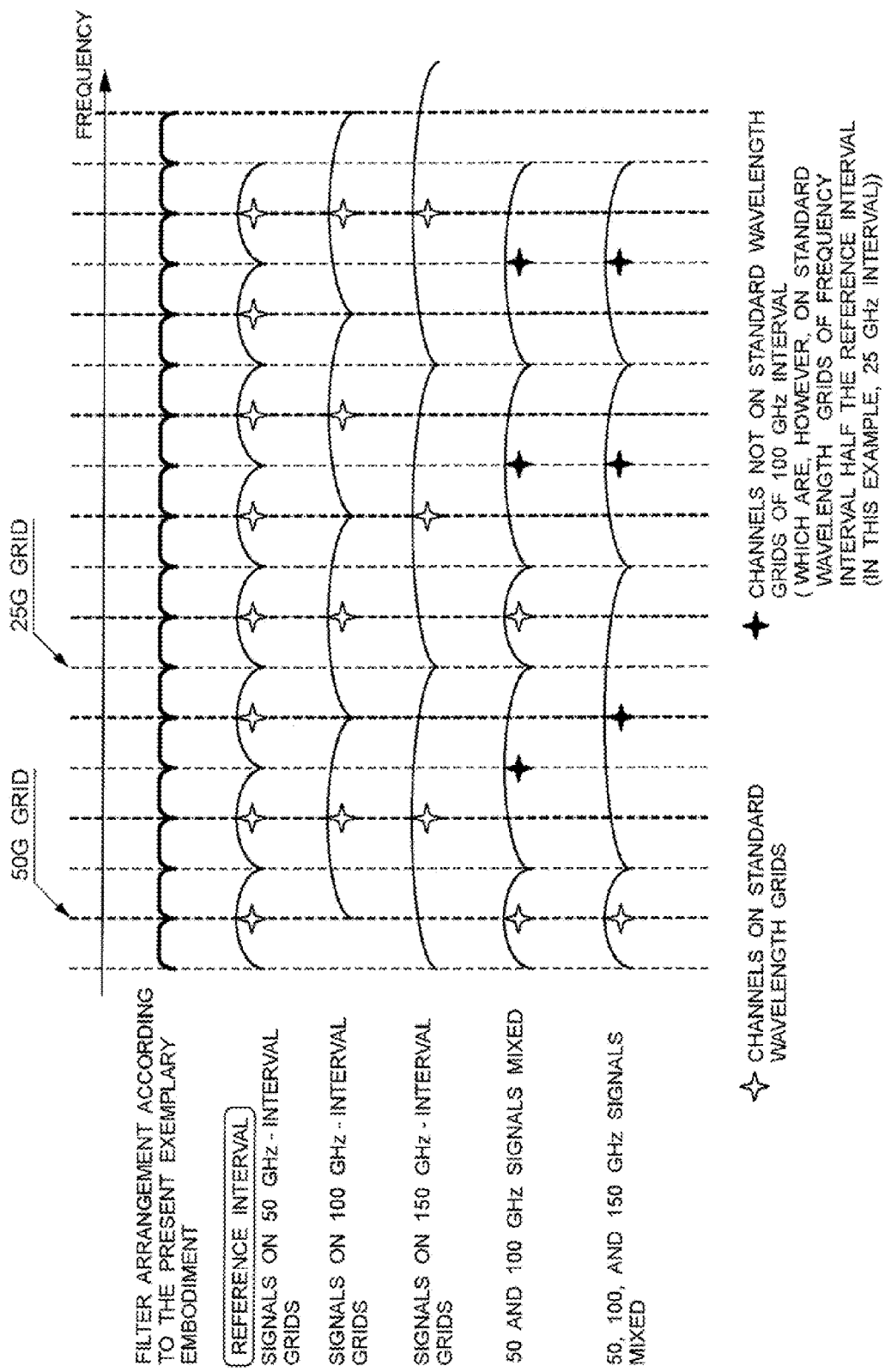
FIG. 3 is a diagram for illustrating a second exemplary embodiment of the invention.

A second exemplary embodiment of the present invention will be now described using FIG. 3. The second exemplary embodiment of the invention uses the wavelength division multiplexing filter according to the first exemplary embodiment of the invention. A difference of the second exemplary embodiment from the first exemplary embodiment is that it permits free arrangement of a signal whose center frequency is on wavelength grids having a frequency interval which is an integer multiple of the reference frequency interval of 50 GHz and whose spectral width approximately fits in the integer-multiple frequency interval, on standard wavelength grids at intervals of 25 GHz, half the reference frequency interval.

As illustrated in FIG. 3, when 50 GHz-wide and 100 GHz-wide signals are mixed, the center frequencies of the 50 GHz-wide signals are on standard wavelength grids of 50 GHz interval, but the 100 GHz-wide signals are arranged such that their center frequencies are on standard wavelength grids of 25 GHz interval, not being limited to the standard wavelength grids of 100 GHz interval. Similarly, when the 50 GHz-, 100, GHz-, and 150 GHz-wide signals are mixed, the center frequencies of the 50 GHz-wide signals are on standard wavelength grids of 50 GHz interval, but the 100 and 150 GHz-wide signals are arranged such that their center frequencies are on standard wavelength grids of 25 GHz interval, not being limited to the standard wavelength grids of 100 GHz and 150 GHz intervals.

Thus, the second exemplary embodiment of the invention permits free arrangement of signals having different spectral widths on the standard wavelength grids of 25 GHz interval, half the reference frequency interval. It therefore can arrange such signals closely and without gaps therebetween even when signals of different spectral widths are mixed. Other advantages are not mentioned here as they are similar to those of the first exemplary embodiment.

Today, an increasing number of transmitters/receivers used in wavelength division multiplexing optical transmission systems employ light sources called full-band tunable LDs. This type of LD permits change of oscillation wavelength through control commands. The oscillation wavelength is selectable on wavelength grids rather than being freely configurable. For general full-band tunable LD light sources, either 50 GHz interval or 25 GHz interval can be selectively specified as the wavelength grids at present. Thus, even a transmitter/receiver for wavelength grids having a wider frequency interval than these intervals may sometimes have the ability to set a finer wavelength, in which case the second exemplary embodiment of the invention can be applied.

While the filter (WB or WSS) is shifted by half a cycle in the first and second exemplary embodiments of the invention described above, the same effects can be obtained also by shifting the wavelengths of optical signals, instead of shifting of the filter, because the relative relation between them remains the same. However, shifting of wavelengths is more burdensome because it involves shifting of more elements.

Now, a third exemplary embodiment of the invention will be described using drawings. The third exemplary embodiment of the invention illustrates how to use the wavelength division multiplexing filter of the first and second exemplary embodiments in combination with a fixed filter when the wavelength division multiplexing filter is applied to a node device in a wavelength division multiplexing optical transmission system and a WSS does not have enough ports for covering the number of wavelength multiplexes of the system.

Figure 14:
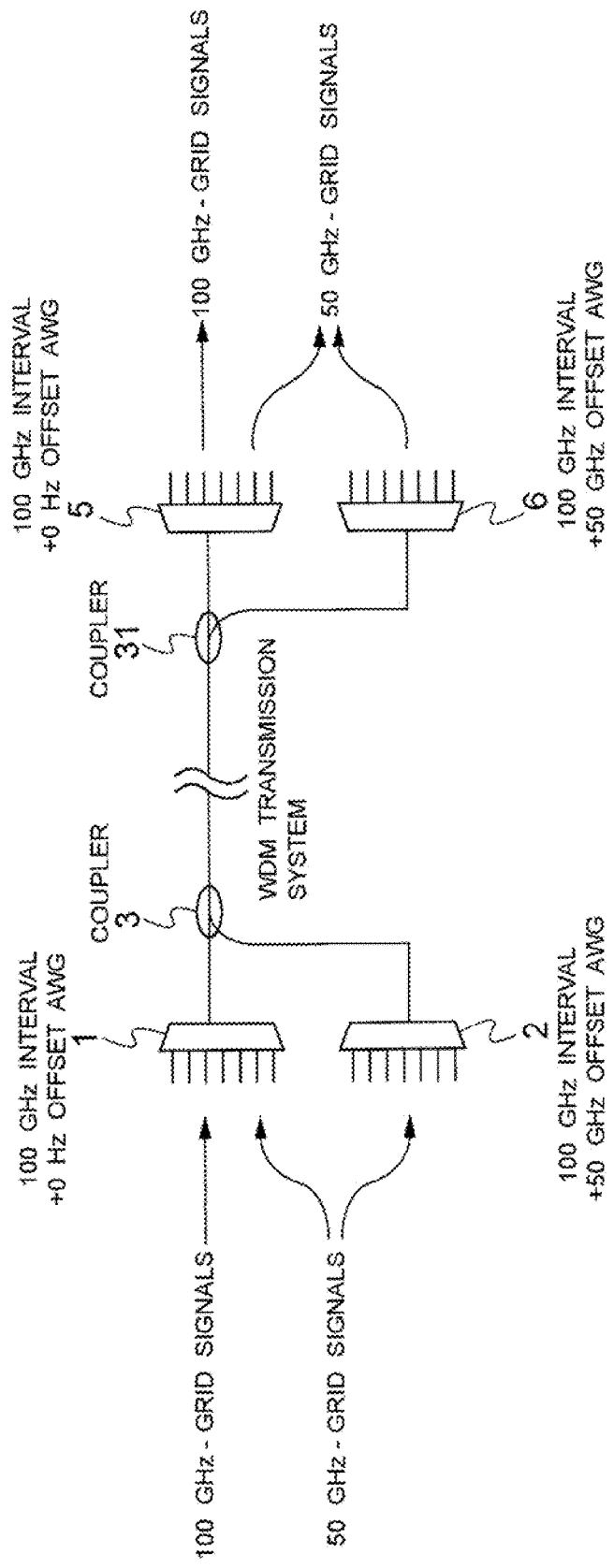
FIG. 14 shows a configuration of a wavelength division multiplexing optical transmission system relating to the present invention.

FIG. 14 shows a configuration of a wavelength division multiplexing optical transmission system that relates to the present invention. In the wavelength division multiplexing optical transmission system shown in FIG. 14, the reference interval is 50 GHz, and 50 GHz-wide signals whose center frequency is on standard wavelength grids of 50 GHz interval and 100 GHz-wide signals whose center frequency is on standard wavelength grids of 100 GHz interval are multiplexed/demultiplexed. Configuration in FIG. 14 uses AWGs of 100 GHz interval for the 100 GHz-wide signals. For the sake of simplicity, it is assumed here that the 100 GHz-interval AWGs are filters that have a frequency slot width of 100 GHz. The wavelength multiplexing side includes an AWG 1 of 100 GHz interval and +0 Hz offset (or shift), an AWG 2 of 100 GHz interval and +50 GHz offset, and a coupler 3.

FIG. 15 illustrates the effects of the wavelength multiplexing side of the wavelength division multiplexing optical transmission system shown in FIG. 14. As shown in FIG. 15, 100 GHz-wide signals whose center frequency is on the standard wavelength grids of 100 GHz interval and 50 GHz-wide signals whose center frequency is on the standard wavelength grids of 50 GHz interval and also on the standard wavelength grids of 100 GHz interval are input to input ports of the AWG 1, Ports 1A, 1B, 1C, 1D . . . The input ports of AWG 1 of FIG. 14 are numbered Ports 1A, 1B, 1C, 1D, . . . , from the top.

Also, signals other than those input to the AWG 1 among the 50 GHz-wide signals with their center frequency on the standard wavelength grids of 50 GHz interval are input to input ports of the AWG 2, Ports 2A, 2B, 2C, 2D, 2E . . . The input ports of AWG 2 of FIG. 14 are numbered Ports 2A, 2B, 2C, 2D, 2E, . . . , from the top. Then, multiplexed output from the AWG 1 and that from the AWG 2 are multiplexed and output by the coupler 3.

The wavelength demultiplexing side may be configured as the reverse of the wavelength multiplexing side: it includes a coupler 31, an AWG 5 of 100 GHz interval and +0 Hz offset, and an AWG 6 of 100 GHz interval and +50 GHz offset, as shown in FIG. 14. However, the configuration so far shown cannot properly demultiplex the 50 GHz-wide signals, thus a 50 G/100 G interleaver (ILV) need to be inserted before receivers for individual wavelengths (i.e., following the output ports of the AWGs 5 and 6) although not shown in FIG. 14.

FIG. 16 illustrates the effects of the wavelength demultiplexing side of the wavelength division multiplexing optical transmission system shown in FIG. 14. As shown in FIG. 16, multiplexed output from the coupler 3 is split by the coupler 31 and input to the AWGs 5 and 6, and demultiplexed signals are output from the output ports of AWG 5, Ports 5A, 5B, 5C, 5D . . . and the output ports of the AWG 6, Ports 6A, 6B, 6C, 6D, 6E . . . The output ports of AWG 5 of FIG. 14 are numbered Ports 5A, 5B, 5C, 5D . . . from the top and the output ports of AWG 6 of FIG. 14 are numbered Ports 6A, 6B, 6C, 6D, 6E . . . from the top.

Paying attention to output light from output port 6B of the AWG 6 out of output lights from the individual output ports of the AWGs 5 and 6, a 50 GHz-wide signal is not correctly demultiplexed and contains neighboring channels. Thus, the output light from the output port 6B of the AWG 6 is wavelength-demultiplexed by the interleaver provided after the output port 6B.

The configuration of FIG. 14 has the problem of diseconomy because an interleaver has to be provided for each separate receiver. Thus, for a number of receivers to share one interleaver, the AWG 6 of the wavelength demultiplexing side may be replaced with an AWG 35 that has twice as many as ports at intervals of 50 GHz or with an AWG 33 of 100 GHz interval and +0 Hz offset and an AWG 34 of 100 GHz interval and +50 GHz offset that have a 50 G/100 G interleaver 32 preceding them, as shown in FIG. 17. However, such configurations tend to cause operational mistakes because they have two demultiplexing output ports for signals on wavelength grids of 100 GHz interval and those ports have to be selectively used for signal spectral widths of 50 GHz and 100 GHz.

Figure 4:
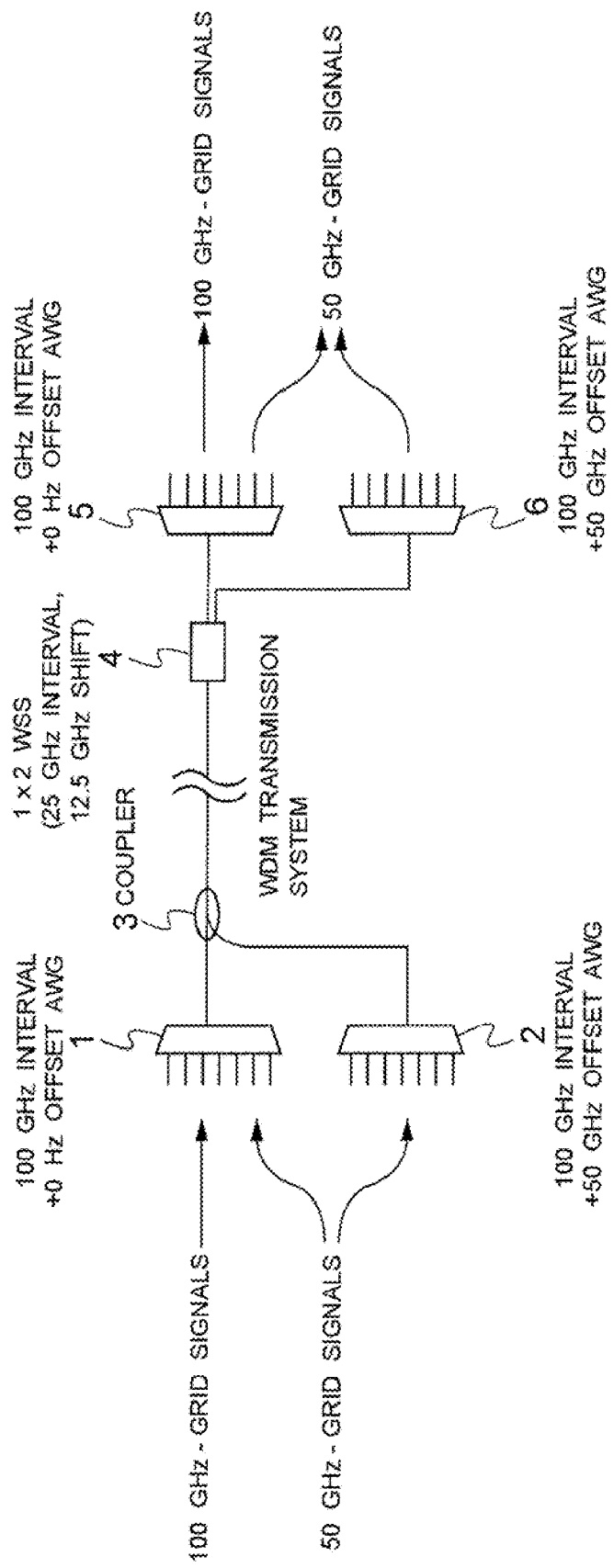
FIG. 4 shows a configuration of a wavelength division multiplexing optical transmission system according to a third exemplary embodiment of the invention.

Accordingly, such a configuration as shown in FIG. 4 is effective. FIG. 4 shows a configuration of the wavelength division multiplexing optical transmission system according to the third exemplary embodiment of the invention, where components similar to those in FIGS. 14 and 17 are denoted with the same reference numerals. The wavelength division multiplexing optical transmission system shown in FIG. 4 is different from the one shown in FIG. 14 in that it uses a 1-input-2-output WSS (25 GHz interval and 12.5 GHz shift) 4 in place of the coupler 31. As the wavelength multiplexing side of the wavelength division multiplexing optical transmission system shown in FIG. 4 is similar to that of the wavelength division multiplexing optical transmission system shown in FIG. 14 which was described using FIG. 15, description thereof is omitted.

Figure 5:
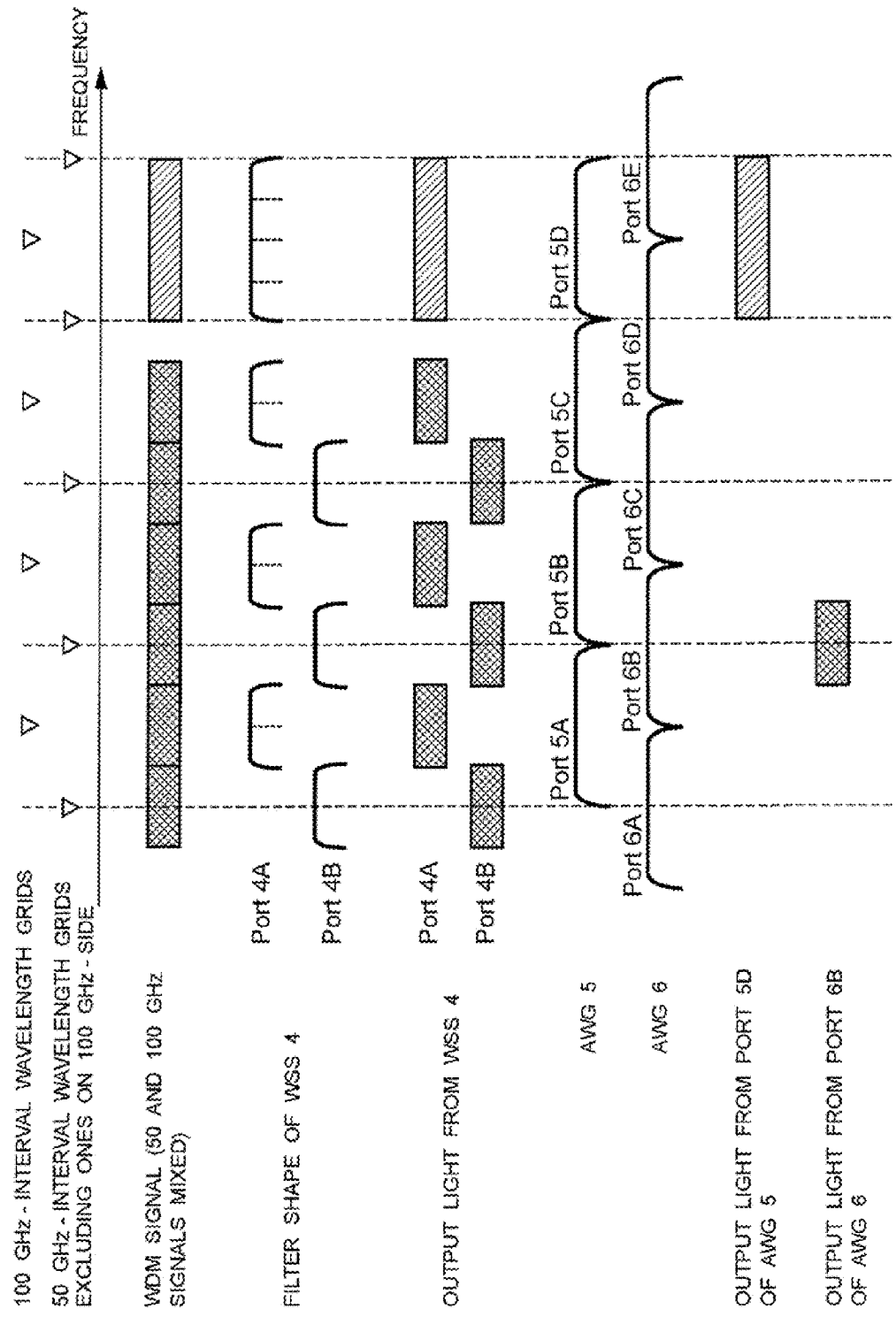
FIG. 5 is a diagram for illustrating effects of the wavelength demultiplexing side of the wavelength division multiplexing optical transmission system shown in FIG. 4.
Figure 6:
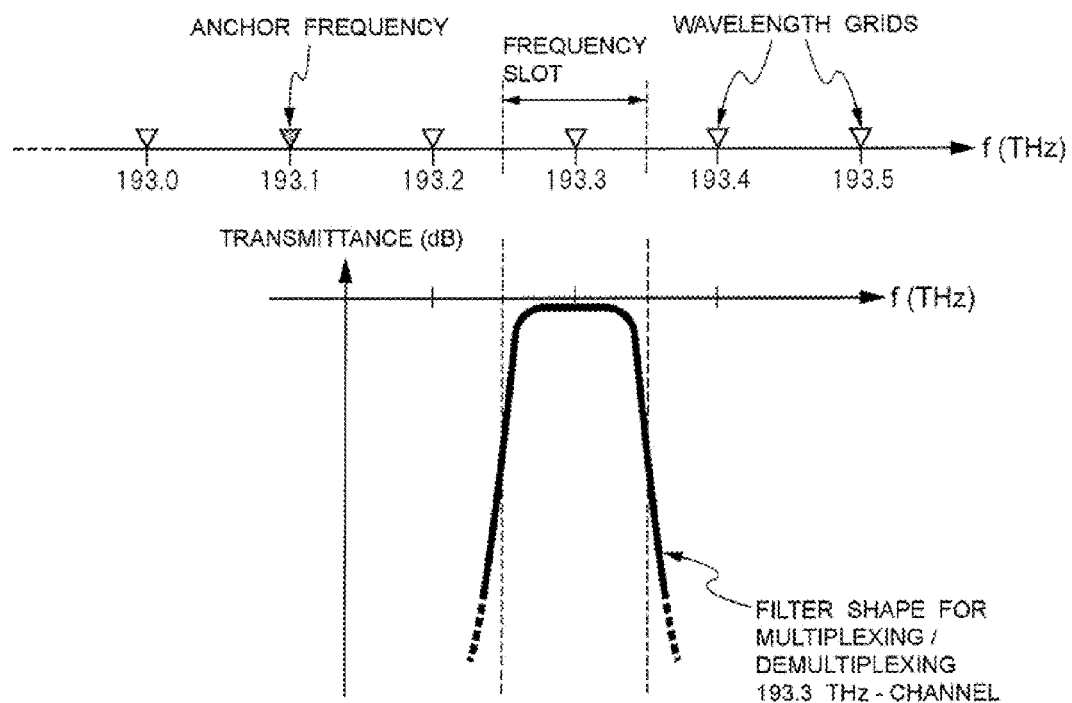
FIG. 6 is a diagram for illustrating wavelength grids.
Figure 7:
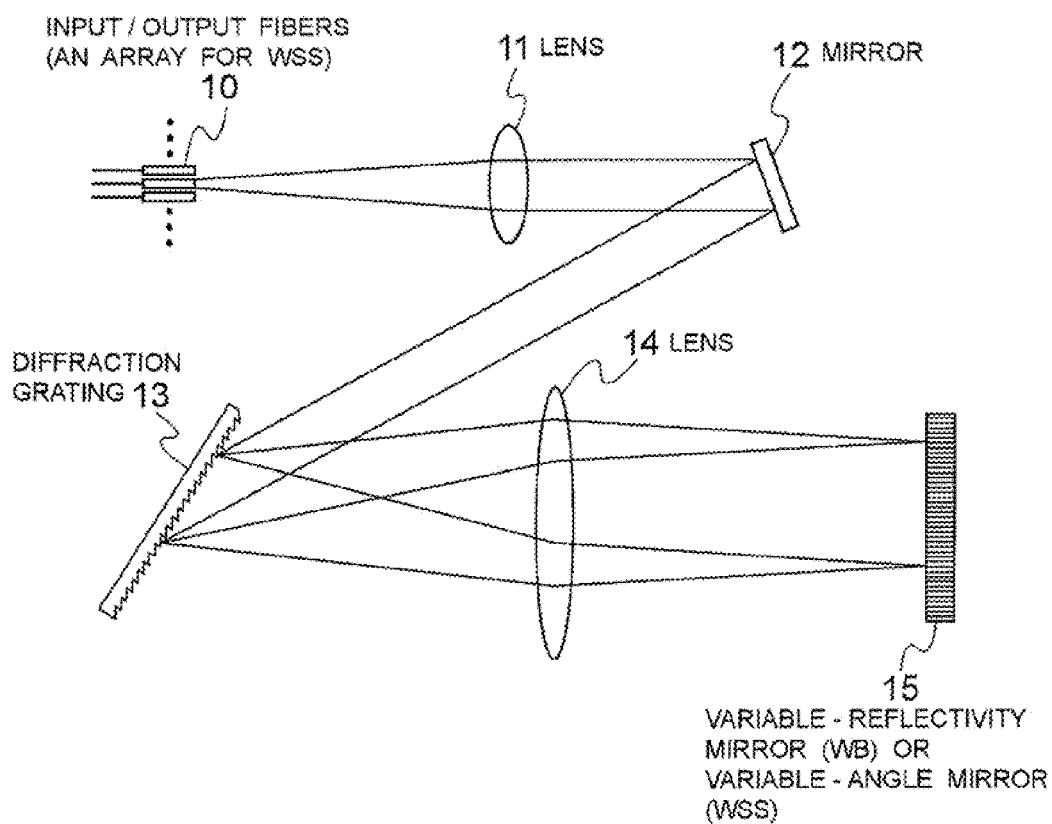
FIG. 7 schematically shows a representative configuration of a variable filter.

FIG. 5 is a diagram for illustrating effects of the wavelength demultiplexing side of the wavelength division multiplexing optical transmission system shown in FIG. 4. The wavelength demultiplexing side of the wavelength division multiplexing optical transmission system shown in FIG. 4 can be considered as an application of the wavelength division multiplexing filter according to the first and second exemplary embodiments of the invention to the configuration of FIG. 11. Each of frequency slots of the WSS 4 corresponds to a frequency interval of 25 GHz, half the reference interval of 50 GHz, and the frequency arrangement of center frequencies of the frequency slots is shifted by half a cycle (i.e., 12.5 GHz) with respect to the cycle of the standard wavelength grids of 25 GHz interval.

As shown in FIG. 5, multiplexed output from the coupler 3 (a WDM signal containing the 50 GHz-wide and 100 GHz-wide signals) is input to the WSS 4. Since the WSS 4 is a variable filter of 25 GHz interval and 12.5 GHz shift as mentioned above, it can filter and classify frequency slots that are on the standard wavelength grids of 50 GHz interval and frequency slots which are an integer multiple thereof to arbitrary ports. Here, for demultiplexing into individual wavelengths in the AWGs 5 and 6 that follow, a WDM signal containing the 100 GHz-wide signals whose center frequency is on the standard wavelength grids of 100 GHz interval and the 50 GHz-wide signals whose center frequency is on the standard wavelength grids of 50 GHz interval and also on the standard wavelength grids of 100 GHz interval is output from the output port 4A of the WSS 4 to the AWG 5. Also, a WDM signal containing signals other than the ones output from the output port 4A among 50 GHz-wide signals whose center frequency is on the standard wavelength grids of 50 GHz interval is output from output port 4B of the WSS 4 to the AWG 6. The two output ports of WSS 4 shown in FIG. 4 are numbered Port 4A and 4B from the top.

The WDM signal input to the AWG 5 is demultiplexed into individual signals and output from the output ports of the AWG 5, Ports 5A, 5B, 5C, 5D . . . While FIG. 5 shows only output light from the Port 5D as the output light from the AWG 5 (i.e., the 100 GHz-wide signal having its center frequency on the standard wavelength grids of 100 GHz interval), it goes without saying that 50 GHz-wide signals whose center frequency is on the standard wavelength grids of 50 GHz interval and also on the standard wavelength grids of 100 GHz interval are output from the other output ports 5A, 5B, and 5C.

Also, the WDM signal input to the AWG 6 is demultiplexed into individual signals and output from the output ports of AWG 6, Ports 6A, 6B, 6C, 6D, 6E . . . While FIG. 5 shows only output light from the Port 6B as the output light from the AWG 6, it goes without saying that individual signals other than the ones output from the AWG 5 among the 50 GHz-wide signals whose center frequency is on the standard wavelength grids of 50 GHz interval are output also from the other output ports 6A and 6C.

Adopting the configuration of FIG. 4, an additional interleaver is not required and operational mistakes can be reduced as one port corresponds to each wavelength grid. Similarly, the wavelength division multiplexing filter according to the first and second exemplary embodiments of the invention can be applied to the configurations of FIGS. 10 and 12. For example, in FIG. 4, a 2-input-1-output WSS (25 GHz interval and 12.5 GHz shift) may be used as the wavelength division multiplexing filter according to the first and second exemplary embodiments of the invention in place of the coupler 3.

Additionally, in the configuration of FIG. 4, the 50 GHz-wide signals whose center frequency is on the standard wavelength grids of 50 GHz interval and 100 GHz-wide signals whose center frequency is on the standard wavelength grids of 100 GHz interval are multiplexed. In addition to those signals, signals whose center frequency is on standard wavelength grids having a frequency interval that is an integer multiple of the reference frequency interval and whose spectral width approximately fits in the integer-multiple frequency interval may be further multiplexed, e.g., 150 GHz-wide signals whose center frequency is on standard wavelength grids of 150 GHz interval and/or 200 GHz-wide signals whose center frequency is on standard wavelength grids of 200 GHz interval.

In such a case, K number of AWGs are used on each of the wavelength multiplexing and wavelength demultiplexing sides. Here, when 50 GHz-, 100 GHz-, and 150 GHz-wide signals are multiplexed, for example, K is determined by dividing 150 GHz, the widest spectral width, by the reference frequency interval, 50 GHz, i.e., K=3. The configuration shown in FIG. 4 corresponds to where K=2.

Each of the K AWGs on the wavelength multiplexing side includes a plurality of input ports, each of which has a passband width which is equal to K times the reference frequency interval, and the interval between center frequencies of passbands of the input ports is K times the reference frequency interval.

The center frequencies of passbands of the input ports of the first one of the K AWGs on the wavelength multiplexing side are on standard wavelength grids that have a frequency interval K times the reference frequency interval, and the frequency arrangement of the center frequencies of passbands of the input ports of the ith AWG (i being an integer, where $2 \leq i \leq K$) is offset by the reference frequency interval with respect to that of the center frequencies of passbands of input ports of the i−1th AWG.

Each of the K AWGs on the wavelength demultiplexing side includes a plurality of output ports, each of which has a passband width which is equal to K times the reference frequency interval, and the interval between center frequencies of passbands of the output ports is K times the reference frequency interval.

The center frequencies of passbands of the output ports of the first one of the K AWGs on the wavelength demultiplexing side are on standard wavelength grids that have a frequency interval K times the reference frequency interval, and the frequency arrangement of the center frequencies of passbands of the output ports of the ith AWG is offset by the reference frequency interval with respect to that of the center frequencies of passbands of output ports of the i−1th AWG. The WSS 4 includes K output ports corresponding to the K AWGs of the wavelength demultiplexing side.

The configuration of FIG. 4 is a combination of a fixed filter such as AWG with a variable filter such as WB and WSS. Such a mixed configuration is primarily due to the fact that only WSSs having ports much fewer than the number of wavelength multiplexes can be realized for the present. At present, a typical WSS has nine ports at most, much fewer than the number of wavelength multiplexes, such as 40 or 80 waves. In general, WSS ports are preferentially used for path allocation for realizing WXC. It is therefore expected that such a variable filter will be used in combination with a fixed filter for the time being. This is why WSS ports are connected to wavelength division multiplexing filters of fixed type (AWGs) in FIGS. 11 and 12.

When WSSs having sufficient ports for covering the number of wavelength multiplexes of a system become available, combination with a fixed filter will be no longer required. It is more desirable not to use a fixed filter because of higher convenience. Needless to say, each AWG in FIG. 9 may be replaced with the wavelength division multiplexing filter according to the first and second exemplary embodiments of the invention in such a case, for example.

Exemplary effects according to the present invention are that it can prevent formation of unusable and wasted bandwidth and freely allocate wavelength bands.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wavelength division multiplexing filter having a variable filter shape, wherein the wavelength division multiplexing filter has a resolution equal to $2^N$ times (N being an integer, where $N \geq 1$) a reference frequency interval and has frequency arrangement of center frequencies of frequency slots corresponding to the $2^N$-times resolution be offset by half a cycle with respect to the frequency arrangement of standard wavelength grids having a frequency interval equal to $\frac{1}{2^N}$ of the reference frequency interval.

2. The wavelength division multiplexing filter according to claim 1, wherein N=1.

3. A wavelength division multiplexing system using the wavelength division multiplexing filter according to claim 1, wherein
the system uses the wavelength division multiplexing filter to multiplex/demultiplex signals whose center frequency is on standard wavelength grids having the reference frequency interval and whose spectral width approximately fits in the reference frequency interval, and signals whose center frequency is on standard wavelength grids having a frequency interval equal to n times (n being an integer, where n≧2) the reference frequency interval and whose spectral width approximately fits in the n-times frequency interval.

4. The wavelength division multiplexing system according to claim 3, comprising
K number of fixed filters (K being a value obtained by dividing a frequency interval approximately equal to a widest spectral width of the signals by the reference frequency interval) that represent one group, wherein
each of the K fixed filters includes a plurality of input ports, each of the input ports having a passband width equal to K times the reference frequency interval, and an interval between center frequencies of passbands of the input ports is K times the reference frequency interval;
the center frequencies of passbands of the input ports of a first fixed filter among the K fixed filters are on standard wavelength grids having a frequency interval K times the reference frequency interval;
the frequency arrangement of center frequencies of passbands of the input ports of the ith fixed filter (i being an integer, where 2≦i≦K) among the K fixed filters is offset by the reference frequency interval with respect to the frequency arrangement of center frequencies of passbands of the input ports of the i–1th fixed filter; and
each of the K fixed filters filters optical signals input to the input ports according to passing characteristics of each of the input ports to multiplex the optical signals, and the wavelength division multiplexing filter multiplexes wavelength-multiplexed signals output from the K fixed filters.

5. The wavelength division multiplexing system according to claim 3, comprising
K number of fixed filters (K being a value obtained by dividing a frequency interval approximately equal to a widest spectral width of the signals by the reference frequency interval) that represent one group, wherein
each of the K fixed filters includes a plurality of output ports, each of the output ports having a passband width equal to K times the reference frequency interval, and the interval between center frequencies of passbands of the output ports is K times the reference frequency interval;
the center frequencies of passbands of the output ports of a first fixed filter among the K fixed filters are on standard wavelength grids having a frequency interval K times the reference frequency interval;
the frequency arrangement of center frequencies of passbands of the output ports of the ith fixed filter (i being an integer, where 2≦i≦K) among the K fixed filters is offset by the reference frequency interval with respect to the frequency arrangement of center frequencies of passbands of the output ports of the i–1th fixed filter; and
the wavelength division multiplexing filter demultiplexes a wavelength-multiplexed signal that has been input thereto into K number of wavelength-multiplexed signals and outputs the signals to the K fixed filters, and each of the K fixed filters filters and demultiplexes the wavelength-multiplexed signal from the wavelength division multiplexing filter according to passing characteristics of the output ports.

6. A wavelength division multiplexing system using the wavelength division multiplexing filter according to claim 1, wherein
the system uses the wavelength division multiplexing filter to multiplex/demultiplex signals whose center frequency is on standard wavelength grids having a frequency interval equal to half the reference frequency interval and whose spectral width approximately fits in the reference frequency interval and signals whose center frequency is on standard wavelength grids having a frequency interval equal to half the reference frequency interval and whose spectral width approximately fits in a frequency interval equal to n times (n being an integer, where n≧2) the reference frequency interval.

7. A wavelength division multiplexing method for a wavelength division multiplexing optical transmission system that comprises a wavelength division multiplexing filter having a variable filter shape, the method comprising:
by using the wavelength division multiplexing filter that has a resolution equal to $2^N$ times (N being an integer, where N≧1) a reference frequency interval and that has frequency arrangement of center frequencies of frequency slots corresponding to the $2^N$-times resolution be offset by half a cycle with respect to the frequency arrangement of standard wavelength grids having a frequency interval equal to $\frac{1}{2}^N$ of the reference frequency interval, multiplexing/demultiplexing signals whose center frequency is on standard wavelength grids having the reference frequency interval and whose spectral width approximately fits in the reference frequency interval, and signals whose center frequency is on standard wavelength grids having a frequency interval equal to n times (n being an integer, where n≧2) the reference frequency interval and whose spectral width approximately fits in the n-times frequency interval.

8. The wavelength division multiplexing method according to claim 7, wherein
the wavelength division multiplexing optical transmission system further comprises K number of fixed filters (K being a value obtained by dividing a frequency interval approximately equal to a widest spectral width of the signals by the reference frequency interval) that represent one group;
each of the K fixed filters includes a plurality of input ports, each of the input ports having a passband width equal to K times the reference frequency interval, and an interval between center frequencies of passbands of the input ports is K times the reference frequency interval;
the center frequencies of passbands of the input ports of a first fixed filter among the K fixed filters are on standard wavelength grids having a frequency interval K times the reference frequency interval; and
the frequency arrangement of center frequencies of passbands of the input ports of the ith fixed filter (i being an integer, where 2≦i≦K) among the K fixed filters is offset by the reference frequency interval with respect to the frequency arrangement of center frequencies of passbands of the input ports of the i–1th fixed filter,
the method further comprising:
filtering and multiplexing, by each of the K fixed filters, optical signals input to the input ports according to passing characteristics of each of the input ports, and multiplexing, by the wavelength division multiplexing filter, wavelength-multiplexed signals output from the K fixed filters.

9. The wavelength division multiplexing method according to claim 7, wherein
the wavelength division multiplexing optical transmission system further comprises K number of fixed filters (K being a value obtained by dividing a frequency interval approximately equal to a widest spectral width of the signals by the reference frequency interval) that represent one group;

each of the K fixed filters includes a plurality of output ports, each of the output ports having a passband width equal to K times the reference frequency interval, and the interval between center frequencies of passbands of the output ports is K times the reference frequency interval;

the center frequencies of passbands of the output ports of a first fixed filter among the K fixed filters are on standard wavelength grids having a frequency interval K times the reference frequency interval; and the frequency arrangement of center frequencies of passbands of the output ports of the ith fixed filter (i being an integer, where $2 \leq i \leq K$) among the K fixed filters is offset by the reference frequency interval with respect to the frequency arrangement of center frequencies of passbands of the output ports of the i−1th fixed filter, the method further comprising:

demultiplexing, by the wavelength division multiplexing filter, a wavelength-multiplexed signal that has been input thereto into K number of wavelength-multiplexed signals and outputting the signals to the K fixed filters, and filtering and demultiplexing, by each of the K fixed filters, the wavelength-multiplexed signal from the wavelength division multiplexing filter according to passing characteristics of the output ports.

10. The wavelength division multiplexing method according to claim 7, wherein N=1.

11. A wavelength division multiplexing method for a wavelength division multiplexing optical transmission system that comprises a wavelength division multiplexing filter having a variable filter shape, the method comprising:

by using the wavelength division multiplexing filter that has a resolution equal to $2^N$ times (N being an integer, where $N \geq 1$) a reference frequency interval and has frequency arrangement of center frequencies of frequency slots corresponding to the $2^N$-times resolution be offset by half a cycle with respect to the frequency arrangement of standard wavelength grids having a frequency interval equal to $\frac{1}{2}^N$ of the reference frequency interval, multiplexing/demultiplexing signals whose center frequency is on standard wavelength grids having a frequency interval equal to half the reference frequency interval and whose spectral width approximately fits in the reference frequency interval, and signals whose center frequency is on standard wavelength grids having a frequency interval equal to half the reference frequency interval and whose spectral width approximately fits in a frequency interval equal to n times (n being an integer, where $n \geq 2$) the reference frequency interval.

12. The wavelength division multiplexing method according to claim 11, wherein N=1.

* * * * *